(12) United States Patent
Fukui (10) Patent No.: US 11,872,945 B2
(45) Date of Patent: Jan. 16, 2024

(54) AUTOMOTIVE SOUND ABSORPTION MATERIAL

(71) Applicant: KOTOBUKIYA FRONTE CO., LTD., Tokyo (JP)

(72) Inventor: Kazuki Fukui, Saitama (JP)

(73) Assignee: KOTOBUKIYA FRONTE CO., LTD. (JP)

(*) Notice: Subject to any disclaimer, the term of this patent is extended or adjusted under 35 U.S.C. 154(b) by 424 days.

(21) Appl. No.: 17/267,153

(22) PCT Filed: Sep. 14, 2018

(86) PCT No.: PCT/JP2018/034144
§ 371 (c)(1),
(2) Date: Feb. 9, 2021

(87) PCT Pub. No.: WO2020/054050
PCT Pub. Date: Mar. 19, 2020

(65) Prior Publication Data
US 2021/0309164 A1    Oct. 7, 2021

(51) Int. Cl.
*B60R 13/08* (2006.01)
*B32B 3/12* (2006.01)
(Continued)

(52) U.S. Cl.
CPC ............ *B60R 13/0815* (2013.01); *B32B 3/12* (2013.01); *B32B 3/266* (2013.01); *B32B 7/12* (2013.01);
(Continued)

(58) Field of Classification Search
CPC ....... B60R 13/0815; B32B 3/12; B32B 3/266; B32B 7/12; B32B 2307/102;
(Continued)

(56) References Cited

U.S. PATENT DOCUMENTS 5,750,944 A    5/1998  Fuchs
2005/0126852 A1*  6/2005  Nakajima ........... B29C 65/1432
                                                    181/293
(Continued)

FOREIGN PATENT DOCUMENTS

JP    S62225641 A    10/1987
JP    H04303637 A    10/1992
(Continued)

OTHER PUBLICATIONS

Extended European Search Report including Written Opinion for EP18933645.6 dated Jul. 22, 2021; 11 pages.
(Continued)

*Primary Examiner* — Forrest M Phillips
(74) *Attorney, Agent, or Firm* — Lerner David LLP (57) ABSTRACT

There is provided a sound-absorbing material for a vehicle, capable of stably yielding desired sound absorption performance while reducing weight of the sound-absorbing material for a vehicle. The sound-absorbing material for a vehicle of the present invention has a multilayer structure, including: a core layer in which tubular cells are arranged in a plurality of rows; and an airflow-blocking resin film layer adhered to one surface of the core layer. The relationship between the Young's modulus E (MPa) of the airflow-blocking resin film layer 40 and the surface density M (g/m$^2$) of the layer structure on the first airflow-blocking resin film layer 40 side with respect to the core layer 10 is $0.5<E/M<21$.

5 Claims, 4 Drawing Sheets (51) Int. Cl.
    *B32B 3/26*      (2006.01)
    *B32B 7/12*      (2006.01)

(52) U.S. Cl.
    CPC ... *B32B 2307/102* (2013.01); *B32B 2307/546* (2013.01); *B32B 2307/72* (2013.01); *B32B 2307/7242* (2013.01); *B32B 2605/00* (2013.01)

(58) Field of Classification Search
    CPC .......... B32B 2307/546; B32B 2307/72; B32B 2307/7242; B32B 2605/00
    See application file for complete search history.

(56) References Cited

U.S. PATENT DOCUMENTS

| | | | | |
|---|---|---|---|---|
| 2006/0289231 | A1* | 12/2006 | Priebe | B32B 3/266 181/290 |
| 2008/0176027 | A1 | 7/2008 | Pflug et al. | |
| 2009/0205901 | A1 | 8/2009 | Tanase et al. | |
| 2011/0250384 | A1* | 10/2011 | Sumi | B32B 3/28 156/228 |
| 2011/0277911 | A1* | 11/2011 | Allen | B62D 29/002 181/284 |
| 2016/0082901 | A1* | 3/2016 | Bock | B60R 13/0212 296/187.05 |
| 2017/0341186 | A1 | 11/2017 | Hakuta et al. | |
| 2018/0058066 | A1 | 3/2018 | Yamazoe et al. | |
| 2018/0095209 | A1 | 4/2018 | Hakuta et al. | |
| 2019/0295522 | A1 | 9/2019 | Hakuta | |
| 2020/0005757 | A1 | 1/2020 | Ohtsu et al. | |

FOREIGN PATENT DOCUMENTS

| | | |
|---|---|---|
| JP | H10156985 A | 6/1998 |
| JP | H10205352 A | 8/1998 |
| JP | 2000136581 A | 5/2000 |
| JP | 2001295452 A | 10/2001 |
| JP | 2006218759 A | 8/2006 |
| JP | 2008213652 A | 9/2008 |
| JP | 4368399 B2 | 11/2009 |
| JP | 4539294 B2 | 9/2010 |
| JP | 2013174849 A | 9/2013 |
| JP | 2013237242 A | 11/2013 |
| JP | 2014080359 A | 5/2014 |
| JP | 2015511194 A | 4/2015 |
| JP | 2016207989 A | 12/2016 |
| JP | 2017151256 A | 8/2017 |
| JP | 2017151325 A | 8/2017 |
| WO | 2006053407 A9 | 5/2012 |
| WO | 2013126739 A1 | 8/2013 |
| WO | 2016/208507 A1 | 12/2016 |
| WO | 2016208331 A1 | 12/2016 |
| WO | 2018101164 A1 | 6/2018 |
| WO | 2018/150828 A1 | 8/2018 |

OTHER PUBLICATIONS

International Search Report for Application No. PCT/KR2018/034144, dated Nov. 30, 2018, 2 pages.

\* cited by examiner

AUTOMOTIVE SOUND ABSORPTION MATERIAL

CROSS-REFERENCE TO RELATED APPLICATIONS

The present application is a national phase entry under 35 U.S.C. § 371 of International Application No. PCT/JP2018/034144 filed Sep. 14, 2018, published in Japanese, incorporated herein by reference.

TECHNICAL FIELD

The present invention relates to a sound-absorbing material for vehicles.

BACKGROUND ART

A typical structure of a vehicle has an engine compartment provided at the front, a trunk compartment provided at the rear, and a passenger compartment provided in the middle thereof. The passenger compartment is provided with seats such as a driver's seat, a front passenger seat, and a rear seat. The passenger compartment has a dash insulator, a floor carpet, a floor spacer, a trunk trim, and a trunk floor installed so that they cover the outside of the vehicle interior. These components are formed in an uneven shape according to shapes of vehicle bodies or designs of components. Furthermore, the exterior under a vehicle body has a front fender liner, a rear fender liner, and an undercover which is formed in an uneven shape for controlling air flow, installed thereon. For many of these components, a thermoplastic resin is used as a material, and each of the materials is heated and press-molded by a die having the shape of the component to be finished into an uneven-shaped component having a plurality of portions with different thicknesses.

As a recent trend in vehicle development, the quietness in the interior of a vehicle is emphasized. Noise transmitted to the interior of a vehicle includes noise from the windows, noise from the tires, noise from under the vehicle body, noise from engine sounds, and noise from motor sounds. It is said that particularly noise of frequencies of 500 Hz to 4000 Hz is annoying to drivers and passengers. In addition, it is said that, in electric vehicles, even frequencies of 4000 to 8000 Hz, to which annoyance has not been felt conventionally, would cause annoyance to drivers and passengers because electric vehicles have no engine. Therefore, the interior and exterior components of vehicles are required to have a function of absorbing noise in these frequency bands. On the other hand, it is also important to reduce fuel consumption, and it is also required to reduce weight of interior and exterior components of vehicles.

In addition, JP 4539294 B discloses that, at both ends of a honeycomb core made of non-metal, frequency selection plates with apertures made of light metal are adhered via an adhesive, and fiber reinforced substrates are adhered outside the plates, in which the frequency selection plates transmit or block a specific frequency.

REFERENCE DOCUMENT LIST

Patent Document

Patent Document 1: JP 4539294 B

SUMMARY OF THE INVENTION

Problem to be Solved by the Invention

The frequency selection plate of JP 4539294 B is made of light metal, so a sound damping effect is expected due to the friction of air passing through the aperture of the frequency selection plate, but there is no further effect. In addition, when a member having apertures is used, there is a problem in that dirt accumulates in the apertures, changing the frequency of transmission or blocking so that the desired sound absorption performance cannot be stably obtained.

Therefore, it is an object of the present invention to provide a sound-absorbing material for a vehicle, capable of stably yielding desired sound absorption performance while reducing the weight of the sound-absorbing material for a vehicle.

Means for Solving the Problem

In order to achieve the object, the present invention provides a sound-absorbing material for a vehicle, having a multilayer structure, the material including: a core layer having tubular cells, the tubular cells being arranged in a plurality of rows; and a first airflow-blocking resin film layer adhered to one surface of the core layer, wherein a relationship between a Young's modulus $E_1$ (MPa) of the first airflow-blocking resin film layer and a surface density $M_1$ (g/m$^2$) of a layer structure on the first airflow-blocking resin film layer side with respect to the core layer is $0.5 < E_1/M_1 < 21$.

The tubular cell may have a polygonal tubular shape such as a substantially quadrangular tubular shape or a substantially hexagonal tubular shape, or may have a curved tubular shape such as a substantially circular tubular shape or a substantially elliptical tubular shape. It is preferable that each of the cells in the core layer have a closed surface at one end and an open end at another end, the open ends of the cells allow an internal space of the cell to be in communication with an outside, and the open ends of the cells be arranged on both sides of the core layer such that rows of the open ends of the cells are in every other row. The open end, the one-side closed surface, and the other-side closed surface may have a polygonal shape such as a substantially quadrangular shape or a substantially hexagonal shape, or may have a curved shape such as a substantially circular shape or a substantially elliptical shape, according to the shape of the cell.

The first airflow-blocking resin film layer may have a structure in which a plurality of materials having different Young's modulus are laminated. The Young's modulus $E_1$ in this case is the Young's modulus of the entire first airflow-blocking resin film layer. In addition, the sound-absorbing material for a vehicle, of the present invention, may further include an inner surface layer on the surface of the first airflow-blocking resin film layer opposite to the core layer. The surface density $M_1$ in this case is the total surface density (mass per unit area) of the first airflow-blocking resin film layer and the inner surface layer. The inner surface layer is a layer of the surface facing the vehicle inner side, and may be, for example, a layer configured with fiber such as nonwoven fabric, plain needle punched fabric, or velour, a layer configured with a foamed resin such as urethane foam, polyethylene foam or nylon foam, or a layer in which these are combined.

The sound-absorbing material for a vehicle of the present invention may further include a second airflow-blocking resin film layer adhered to a surface of the core layer, the surface being opposite to the surface to which the first airflow-blocking resin film layer is adhered. In this case, a relationship between a Young's modulus $E_2$ (MPa) of the second airflow-blocking resin film layer and a surface density $M_2$ (g/m$^2$) of a layer structure on the second airflow-blocking resin film layer side with respect to the core layer may satisfy $0.5<E_2/M_2<21$ or need not satisfy it. In addition, the absolute value of the difference between $E_1/M_1$ and $E_2/M_2$ may be 0.8 or more. Furthermore, the sound-absorbing material for a vehicle of the present invention may further include an outer surface layer on the surface of the second airflow-blocking resin film layer opposite to the core layer. The surface density $M_2$ in this case is the total surface density of the second airflow-blocking resin film layer and the outer surface layer. The outer surface layer is a layer of the surface facing the vehicle outer side, and may be, for example, a layer configured with fiber such as nonwoven fabric, plain needle punched fabric, or velour, a layer configured with a foamed resin such as urethane foam, polyethylene foam or nylon foam, or a layer in which these are combined.

Alternatively, the sound-absorbing material for a vehicle, of the present invention, may further include a resin film layer having a plurality of apertures, the resin film layer being adhered to a surface of the core layer, the surface being opposite to the surface to which the first airflow-blocking resin film layer is adhered.

Effects of the Invention

As described above, the sound-absorbing material for a vehicle, according to the present invention, includes: a core layer in which tubular cells are arranged in a plurality of rows; and a first airflow-blocking resin film layer adhered to one surface of the core layer. The sound-absorbing material for a vehicle has a configuration such that a relationship between a Young's modulus $E_1$ of the first airflow-blocking resin film layer and a surface density $M_1$ of a layer structure on the first airflow-blocking resin film layer side with respect to the core layer is $0.5<E_1/M_1<21$. With this configuration, when the airflow-blocking resin film layer has a Young's modulus $E_1$ significantly smaller than typical ones with respect to the surface density $M_1$, use of an airflow-blocking resin film layer, which generally is not considered to contribute to sound absorption, also contributes to sound absorption from the relationship with the predetermined structure of the core layer. This makes it possible to obtain desired sound absorption performance having a peak of sound absorption coefficient in the frequency band of 500 Hz to 8000 Hz, which causes annoying noise in vehicles. As described above, the predetermined structure of the core layer and the first airflow-blocking resin film layer enables high rigidity even with weight reduction of the vehicle component. The structure also enables exhibiting the desired sound absorption performance without using a member having a plurality of apertures, which can eliminate accumulation of dirt in the apertures to stably obtain the desired sound absorption performance.

The configuration, in which the first airflow-blocking resin film layer has a structure in which a plurality of materials having different Young's modulus are laminated, facilitates the design of the Young's modulus $E_1$ and the surface density $M_1$. This can facilitate the control of the peak of the sound absorption coefficient.

The configuration, in which an inner surface layer is further provided on the surface of the first airflow-blocking resin film layer opposite to the core layer, makes it possible to protect the first airflow-blocking resin film layer having a Young's modulus less than general ones, and to stably obtain the desired sound absorption performance.

The configuration is such that: a second airflow-blocking resin film layer is adhered to the surface of the core layer opposite to the surface to which the first airflow-blocking resin film layer is adhered; and the absolute value of the difference between $E_2/M_2$ and $E_1/M_1$ is 0.8 or more, where $E_2$ is the Young's modulus of the second airflow-blocking resin film layer, and $M_2$ is the surface density of the layer structure on the second airflow-blocking resin film layer side with respect to the core layer. This configuration makes it possible to obtain a sound-absorbing material for a vehicle, having two peaks of sound absorption coefficient in a frequency band of 500 Hz to 8000 Hz, which causes annoying noise in a vehicle, and thus, has excellent sound absorption performance with a wide frequency band of absorbing sound.

The sound-absorbing material for a vehicle may further include a resin film layer having a plurality of apertures, the resin film layer adhered to the surface of the core layer opposite to the surface to which the first airflow-blocking resin film layer is adhered. An aperture pattern preformed on the resin film layer having a plurality of apertures makes it possible to readily adjust and stably maintain the degree of blockage of the open end on at least one surface of the core layer. This enables controlling the peak of the sound absorption coefficient of the sound-absorbing material for a vehicle, and thus enables, together with the E/M values, more readily controlling the peak of the sound absorption coefficient of the sound-absorbing material for a vehicle into a desired frequency band.

A sound-absorbing material for a vehicle has a configuration such that: each of the cells in the core layer has a closed surface at one end and an open end at another end; the open ends of the cells allow an internal space of the cell to be in communication with an outside; and the open ends of the cells are arranged on both sides of the core layer such that rows of the open ends of the cells are in every other row. With this configuration, the closed surface of the cell in the core layer ensures that it serves as a surface for adhering the first airflow-blocking resin film layer and the core layer, and the closed surface of the cell is arranged in every other row. This can improve adhesiveness between the first airflow-blocking resin film layer and the core layer.

MODE FOR CARRYING OUT THE INVENTION

An embodiment of a sound-absorbing material for a vehicle, according to the present invention, is described below with reference to the accompanying drawings. Note that the drawings are not intended to be drawn to scale unless otherwise specified.

Figure 1:
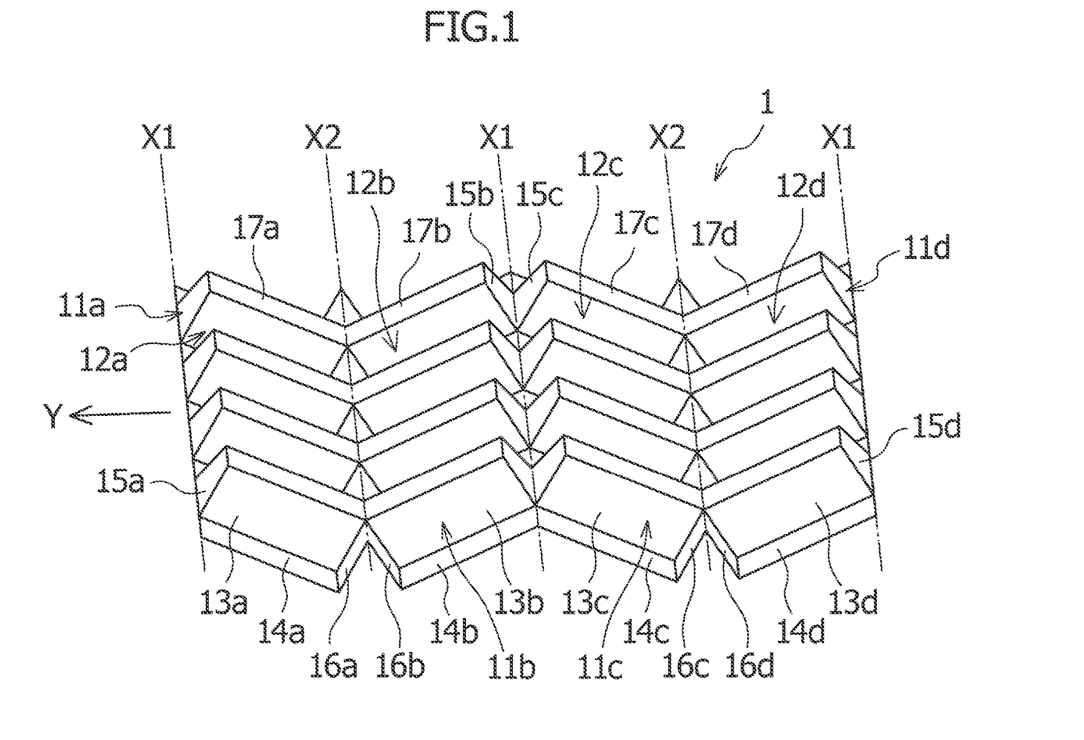
FIG. 1 is a perspective view showing a manufacturing process of a core material used for a core layer in a sound-absorbing material for a vehicle according to the present invention.

First, a core layer common to each embodiment of the sound-absorbing material for a vehicle, according to the present invention, is described below. FIG. 1 is a perspective view showing a manufacturing process of a core material which becomes the core layer. Note that a manufacturing method of this core material is described in detail in WO 2006/053407 A, which is incorporated herein by reference.

As shown in FIG. 1, a flat material sheet is thermoformed by a roller (not shown) having a predetermined die to be plastically deformed substantially without cutting the sheet, so that a core material 1 in the figure is formed. The material of the core material 1 to be used can include, for example, a thermoplastic resin such as polypropylene (PP), polyethylene (PE), polyethylene terephthalate (PET), a composite material with fibers, paper, and metal, but it is not limited to these. In particular, a thermoplastic resin is preferable. In this embodiment, a case in which a thermoplastic resin is used is described below. The thickness of the material sheet is preferably in the range of 0.05 mm to 0.50 mm, for example, but it is not limited to this, and the thickness of the core material 1 after thermoforming is substantially the same.

Figure 2:
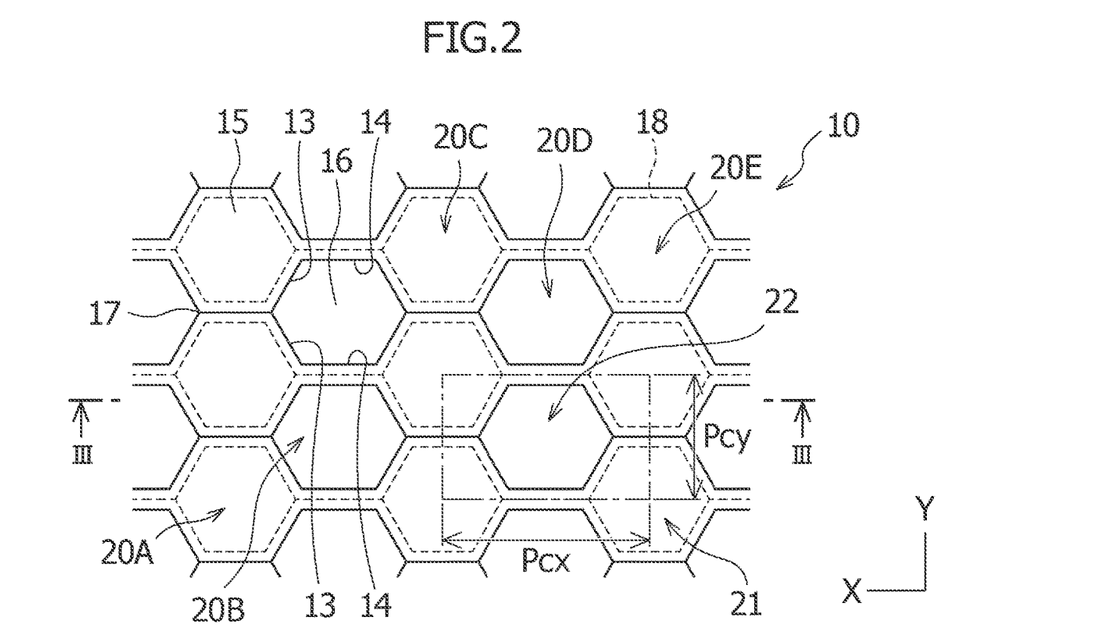
FIG. 2 is a schematic plan view showing a core layer in a sound-absorbing material for a vehicle according to the present invention.

The core material 1 has a three-dimensional structure in which ridge portions 11 and valley portions 12 are alternately arranged in a width direction X orthogonal to a manufacturing direction Y. The ridge portion 11 is configured with two side surfaces 13 and a top surface 17 between them, and the valley portion 12 is configured with two side surfaces 13 shared with the adjacent ridge portions 11 and a bottom surface 14 between them. In this embodiment, a case is described in which the shape of the ridge portion 11 is a trapezoid as shown in FIG. 2, but the present invention is not limited to this. In addition to polygons such as triangles or rectangles, shapes may be curved shapes such as sine curves or bow shapes.

The core material 1 includes the three-dimensional structure continuously in the manufacturing direction Y. That is, as shown in FIG. 1, a plurality of ridge portions 11a, 11b, 11c, and 11d are continuously formed in the manufacturing direction Y. The valley portions 12 are also formed continuously. The connection between the ridge portions 11 and the connection between the valley portions 12 are made by alternately repeating two types of connection methods.

The first connection method is such that, as shown in FIG. 1, on a first folding line X1 in the width direction, top surfaces 17b and 17c of two adjacent ridge portions 11b and 11c are connected, via trapezoidal-shaped ridge portion connecting surfaces 15b and 15c, respectively. The ridge portion connecting surface 15 is formed at a right angle to the top surface 17. On the first folding line X1 in the width direction, the bottom surfaces 14b and 14c of two adjacent valley portions are directly connected. The second connection method is such that, as shown in FIG. 2, on a second folding line X2 in the width direction, bottom surfaces 14a and 14b (or 14c and 14d) of two adjacent valley portions are connected, via trapezoidal-shaped valley portion connecting surfaces 16a and 16b (or 16c and 16d), respectively. The valley portion connecting surface 16 is formed at a right angle to the bottom surface 14. On the second folding line X2 in the width direction, top surfaces 12a and 12b (or 12c and 12d) of two adjacent ridge portions are directly connected.

Thus, the core material 1 has a plurality of three-dimensional structures (the ridge portions 11 and the valley portions 12) connected via the connection regions (the ridge portion connecting surfaces 15 and the valley portion connecting surfaces 16), and has the connection region folded to form a core layer of the sound-absorbing material for a vehicle, of the present invention. Specifically, the core material 1 is mountain-folded along the first folding line X1 such that the bottom surfaces 14b and 14c of two adjacent valley portions contact back-to-back with each other, and the angle formed by the ridge portion connecting surfaces 15b and 15c of two adjacent ridge portions increases to 180 degrees. In addition, the core material 1 is valley-folded along the second folding line X2 such that top surfaces 17a and 17b (or 17c and 17d) of two adjacent ridge portions contact face to face with each other, and the angle between the valley portion connecting surfaces 16a and 16b (or 16c and 16d) of two adjacent valley portions increases to 180 degrees. A core layer 10 of the sound-absorbing material for a vehicle, of the present invention, obtained by folding the core material 1 in this manner, is shown in FIGS. 2 and 3.

Figure 3:
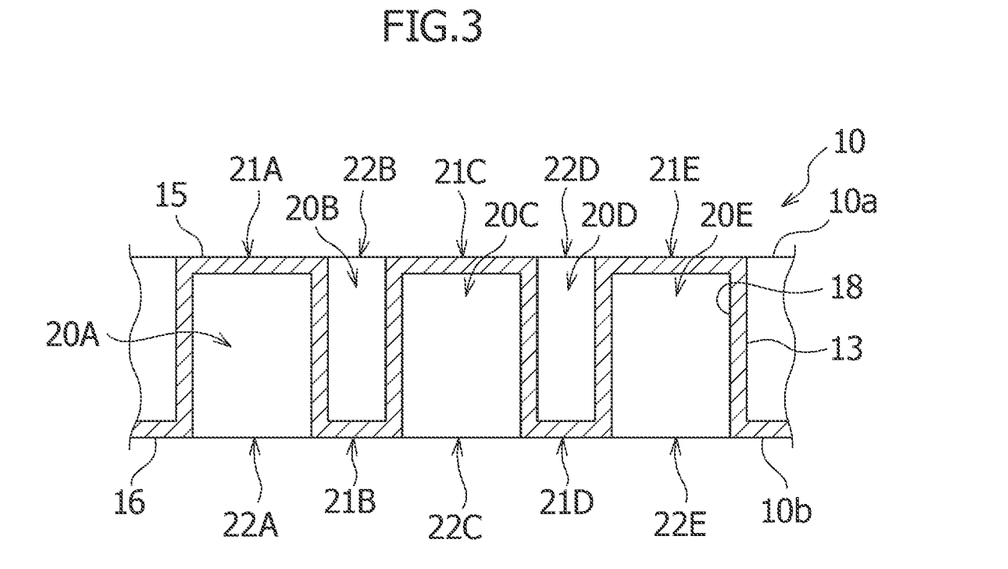
FIG. 3 is a schematic cross-sectional view showing the core layer of FIG. 2 along line III-III.

As shown in FIGS. 2 and 3, the core layer 10 includes substantially hexagonal tubular cells 20 arranged in a plurality of rows, and has cells 20A, 20C and 20E formed out of two adjacent ridge portions and cells 20B and 20D formed out of two adjacent valley portions, each arranged in every other row. A broken line 18 in FIG. 3 is the surface that has been the back surface of the core material, and generally indicates the inner wall of the cell 20 having the substantially hexagonal tubular shape.

The cells 20A, 20C, and 20E formed from the ridge portions includes six cell side walls each forming the substantially hexagonal tubular shape. Each of these cell side walls is formed out of the two top surfaces 17 and the four side surfaces 13 of the cell material. Furthermore, these cells 20A, 20C, and 20E include substantially hexagonal tubular-shaped closed surfaces 21A, 21C, and 21E, respectively, to close the cell ends at the cell end on one surface 10a (front surface in FIG. 2) of the core layer 10. Each of these closed surfaces 21 on one side is formed out of two trapezoidal ridge portion connecting surfaces 15 in the cell material. Furthermore, these cells 20A, 20C, and 20E include open ends 22A, 22C, and 22E that are opened in the substantially hexagonal shape at the cell ends on the other surface 10b which is at the opposite side of the core layer 10. The open ends 22A, 22C, and 22E allow the respective internal spaces of the cells 20A, 20C, and 20E to be in communication with the outside.

The cells 20B and 20D formed from the valley portions also includes six cell side walls each forming the substantially hexagonal tubular shape. Each of these cell side walls is formed from two bottom surfaces 14 and four side surfaces 13 of the cell material. Furthermore, these cells 20B and 20D include open ends 22B and 22D that are opened in the substantially hexagonal shape at the cell ends on the one surface 10a of the core layer 10. The open ends 22B and 22D allow the respective internal spaces of the cells 20B and 20D to be in communication with the outside. Furthermore, these cells 20B and 20D include substantially hexagonal tubular-shaped closed surfaces 21B and 21D that close the cell ends, respectively, at the cell end on the other surface 10b, which is at the opposite side of the core layer 10. Each of these closed surfaces 21 on the other side is formed out of the two trapezoidal valley portion connecting surfaces 16 in the cell material.

In this way, the core layer 10 has the one-side closed surfaces 21A, 21C, and 21E formed out of the ridge portions of the cell material in every other row at the cell end on one surface 10a, and has the other-side closed surfaces 21B and 21D formed out of valley portions of the cell material in the different cell rows from the above at the cell end on the other surface 10b. However, unless otherwise stated, both the closed surface 21 on one side and the closed surface 21 on the other side perform substantially the same function.

The thickness of the entire core layer 10 varies depending on which component of the vehicle a multilayered structure is used for, so it is not limited to the following. However, it is preferably in the range of 3 mm to 25 mm, and is more preferably in the range of 5 mm to 20 mm from the viewpoint of controlling the peak of the sound absorption coefficient by the airflow-blocking resin film layer, to be described below, the sound absorption performance of the core layer 10 itself, and the strength and weight of the core layer 10.

The basis weight (weight per unit area) of the core layer 10 varies depending on which component of the vehicle the multilayered structure is used for, so it is not limited to the following. However, it is preferably in the range of 400 g/m² to 4000 g/m², and is more preferably in the range of 500 g/m² to 3000 g/m². As the thickness of the core layer 10 is greater and the basis weight is greater, the strength of the core layer 10 tends to be higher, and the frequency at which the sound absorption coefficient is at the peak tends to be controllable at lower frequencies, in general.

The basis weight of the core layer 10 can be adjusted by the type of material of the core layer 10, the thickness of the entire core layer 10 or the wall thickness of the cell 20 (thickness of the material sheet) as well as the pitches Pcx and Pcy between the cells 20 of the core layer 10 (distance between the central axes of the cells). In order to set the basis weight of the core layer 10 within the above range, for example, it is preferable that the pitch Pcy between the cells 20 be in the range of 3 mm to 15 mm in the direction in which the cells 20 are adjacent to each other to form a row, which is the core manufacturing direction Y, and it is more preferable that the pitch Pcy be in the range of 4 mm to 10 mm.

Next, individual embodiments of sound-absorbing materials for a vehicle, according to the present invention, are described below using the core layer 10 described above.

First Embodiment

Figure 4:
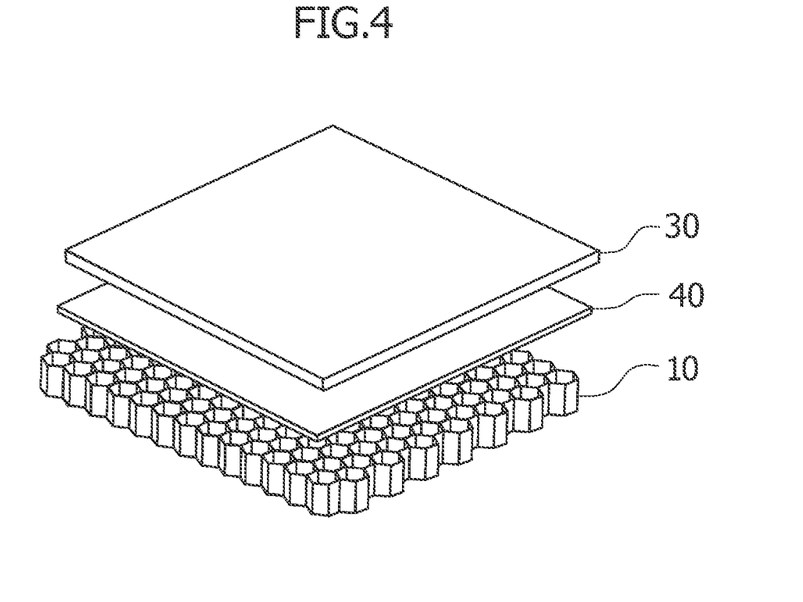
FIG. 4 is an exploded perspective view showing an embodiment of a sound-absorbing material for a vehicle according to the present invention.
Figure 5:
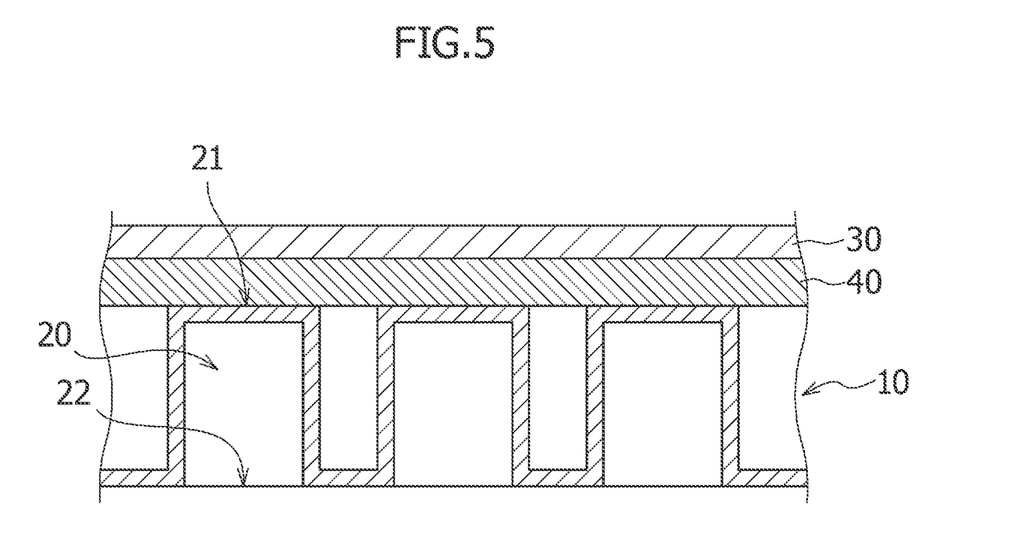
FIG. 5 is a schematic cross-sectional view of the embodiment of the sound-absorbing material for a vehicle shown in FIG. 4.

As shown in FIGS. 4 and 5, a sound-absorbing material for a vehicle, of a first embodiment, includes a core layer 10 described above, an airflow-blocking resin film layer 40 provided on one surface thereof, and a nonwoven fabric layer 30 being provided on the resin film layer 40 and serving as an inner surface layer.

The material of the airflow-blocking resin film layer 40 to be used may be, for example, resin films such as polypropylene (PP), polyethylene (PE), polyethylene terephthalate (PET), and polyamide (PA), but it is not limited to these. In addition, the airflow-blocking resin film layer 40 may have a structure in which a plurality of layers of these different types of resins are laminated, or may have a structure in which a plurality of layers of materials, each having different Young's modulus, are laminated even if they are of the same type of resin.

The Young's modulus E of the airflow-blocking resin film layer 40 is not limited to the following because it depends on a ratio with a surface density E to be described below in detail, but it is lower than those to be used for general vehicle components, and for example, the upper limit thereof is preferably 1700 MPa or less, more preferably 1600 MPa or less, and still more preferably 1500 MPa or less. In addition, the lower limit of the Young's modulus is preferably 200 MPa or more, and more preferably 300 MPa or more, but it is not limited to these. Note that the values of the Young's modulus in the direction in which the molten resin of the film flows (MD) and the Young's modulus in the direction perpendicular thereto (TD) differ depending on the type of resin and/or the manufacturing method of the film, but the Young's modulus of the lower value is used in calculating an E/M of the present invention.

The surface density (basis weight) of the airflow-blocking resin film layer 40 also depends on the total surface density E with the nonwoven fabric layer 30 to be described below, and it is not limited to the following, but the lower limit thereof is, for example, preferably 30 g/m² or more, more preferably 40 g/m² or more, and still more preferably 50 g/m² or more. In addition, the upper limit of the surface density is preferably 500 g/m² or less, more preferably 300 g/m² or less, and still more preferably 250 g/m² or less, but it is not limited to these.

The thickness of the airflow-blocking resin film layer 40 is not limited to the following, but the lower limit thereof is, for example, preferably 0.02 mm or more, more preferably 0.03 mm or more, and still more preferably 0.05 mm or more. In addition, the upper limit of the thickness is preferably 0.8 mm or less, more preferably 0.7 mm or less, and still more preferably 0.6 mm or less, but it is not limited to these.

The airflow-blocking resin film layer 40 may be adhered to the core layer 10 by heat-welding, or may be adhered thereto via an adhesive (not shown). The adhesive to be used is not particularly limited, but for example, it may be an epoxy-based or acrylic-based adhesive. In addition, in order to heat-weld the airflow-blocking resin film layer 40 with the core layer 10 and the nonwoven fabric layer 30, for example, the airflow-blocking resin film layer 40 may have a three-layer structure including a central layer and two adhesive layers located on both side surfaces thereof. In this case, the material of the adhesive layers is a material having a melting point lower than the melting point of the material used for the central layer. For example, polyamide having a melting point of 190° C. to 220° C. is used for the central layer, and polyethylene having a melting point of 90° C. to 130° C. is used for the adhesive layer. Then, the temperature at the time of heating when the airflow-blocking resin film layer 40 is adhered to the core layer 10 and the nonwoven fabric layer 30, and the temperature for thermoforming into a predetermined shape of the sound-absorbing material for a vehicle are set to about 150° C. to 160° C. This configuration and process melts the adhesive layers to firmly adhere to the core layer 10 and the nonwoven fabric layer 30, while not melting the central layer, so that the Young's modulus of the airflow-blocking resin film layer 40 is not significantly changed. This makes it possible to obtain desired sound absorption performance of the sound-absorbing material for a vehicle. As a resin having a melting point higher than that of polyethylene for the adhesive layer, there may be mentioned polypropylene, other than polyamide.

For the nonwoven fabric layer 30, it is preferable to use various nonwoven fabrics such as spunbonded, spunlace, and needle punched nonwoven fabrics using a resin such as polyethylene terephthalate (PET), polypropylene (PP), or polyethylene (PE), but it is not limited to these.

The surface density (basis weight) of the nonwoven fabric layer 30 is not limited to the following because it depends on the total surface density E with the airflow-blocking resin film layer 40, but the lower limit thereof is, for example, preferably 10 g/m$^2$ or more, more preferably 20 g/m$^2$ or more, and still more preferably 30 g/m$^2$ or more. In addition, the upper limit of the surface density is preferably 500 g/m$^2$ or less, more preferably 300 g/m$^2$ or less, and still more preferably 250 g/m$^2$ or less, but it is not limited to these.

In this embodiment, the Young's modulus of the airflow-blocking resin film layer 40 is defined as E, and the total surface density of the airflow-blocking resin film layer 40 and the nonwoven fabric layer 30 is defined as M. Here, E/M values are set to the range of 0.5 to 21 to enable the peak of the sound absorption coefficient of the sound-absorbing material for a vehicle to be controlled into the frequency band of 500 Hz to 8000 Hz, which causes annoying noise in vehicles. Outside of this frequency band, when the peak of the sound absorption coefficient is to be provided in the band of 500 Hz to 4000 Hz, the E/M value is preferably in the range of 0.5 to 8, and furthermore, when the peak of the sound absorption coefficient is to be provided in the band of 1000 Hz to 3000 Hz, the E/M value is more preferably in the range of 1.5 to 5.5. In addition, when the peak of the sound absorption coefficient is to be provided in the band of 4000 Hz to 8000 Hz, the E/M value is preferably in the range of 8 to 21, and furthermore, when the peak of the sound absorption coefficient is to be provided in the band of 5000 Hz to 6000 Hz, the value of E/M is preferably in the range of 11 to 14.

As described above, according to the first embodiment, an airflow-blocking resin film layer 40 is provided on at least one surface of the core layer 10 in which open ends and closed surfaces are arranged in every other row, and a nonwoven fabric layer 30 is further provided on the outside of the resin film layer 40. This configuration enables high rigidity even with weight reduction of the sound-absorbing material for a vehicle. At the same time, the value of E/M, which is the ratio of Young's modulus E of the airflow-blocking resin film layer 40 to the total surface density M of the airflow-blocking resin film layer 40 and the nonwoven fabric layer 30, is adjusted. This enables controlling the peak of the sound absorption coefficient of the sound-absorbing material for a vehicle in a desired frequency band.

Note that, although FIGS. 4 and 5 show a case in which the nonwoven fabric layer 30 is provided on the outside of the airflow-blocking resin film layer 40, the present invention is not limited to this. There may be a configuration such that no nonwoven fabric layer 30 is provided, and the Young's modulus E of the airflow-blocking resin film layer 40 and the surface density M of only the airflow-blocking resin film layer 40 is adjusted. This configuration enables the peak of the sound absorption coefficient of the sound-absorbing material for a vehicle to be controlled in a desired frequency band, similarly to the above.

Second Embodiment

Figure 6:
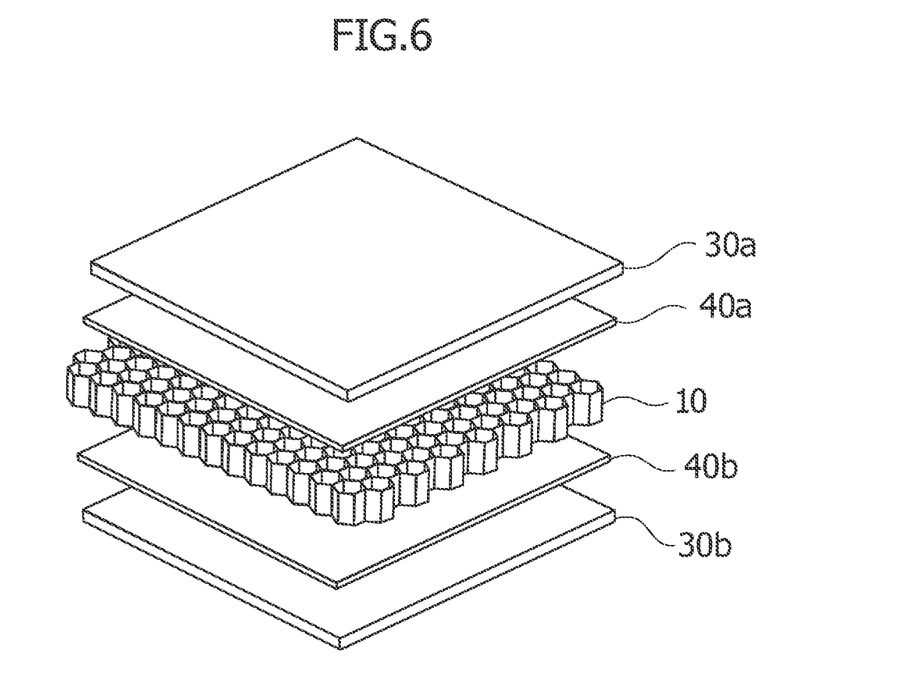
FIG. 6 is an exploded perspective view showing another embodiment of a sound-absorbing material for a vehicle, according to the present invention.

As shown in FIG. 6, a sound-absorbing material for a vehicle of a second embodiment includes: the core layer 10 described above; a first airflow-blocking resin film layer 40a provided on one surface thereof; a second airflow-blocking resin film layer 40b provided on the other surface thereof; and a first and a second nonwoven fabric layers 30a and 30b serving as an inner surface layer and an outer surface layer respectively and being provided on the respective airflow-blocking resin film layers. Note that the same configurations as those in the first embodiment are referred to by the same reference signs, and detailed descriptions thereof are omitted here.

Both the first and second airflow-blocking resin film layers 40a and 40b, and the first and second nonwoven fabric layers 30a and 30b, which are adhered on both side surfaces of the core layer 10, may have the same configuration (the material and thickness of the resin film, the manufacturing method and basis weight of nonwoven fabric, or the like), or may have different configurations on the opposite side surfaces thereof.

Thus, when the airflow-blocking resin film layer 40 is provided on both sides of the core layer 10, the value of E/M, which is the ratio of the Young's modulus E of the airflow-blocking resin film layer 40 to the total surface density M of the airflow-blocking resin film layer 40 and the nonwoven fabric layer 30, is adjusted separately on the first airflow-blocking resin film layer 40a side and the second airflow-blocking resin film layer 40b side. That is, the Young's modulus of the first airflow-blocking resin film layer 40a is defined as $E_1$, and the total surface density of the first airflow-blocking resin film layer 40a and the first nonwoven fabric layer 30a is defined as $M_1$, and $E_1/M_1$ values are set in the range of 0.5 to 21. In addition, the Young's modulus of the second airflow-blocking resin film layer 40b is defined as $E_2$, and the total surface density of the second airflow-blocking resin film layer 40b and the second nonwoven fabric layer 30b is defined as $M_2$, and $E_2/M_2$ values are set to the range of 0.5 to 21. The value of $E_1/M_1$ and the value of $E_2/M_2$ are preferably different, and the absolute value of the difference between $E_1/M_1$ and $E_2/M_2$ is preferably 0.8 or more, more preferably 2.0 or more, and still more preferably 3.0 or more. Note that the upper limit of the absolute value of this difference is not particularly limited, but it is preferably 5 or less, for example.

According to the second embodiment, the sound-absorbing material for a vehicle is configured such that: the airflow-blocking resin film layer 40 and the nonwoven fabric layer 30 are provided on each of both surfaces of the core layer 10 in which the open ends and the closed surfaces are arranged in every other row; both the value of $E_1/M_1$ on the first airflow-blocking resin film layer 40a side and the value of $E_2/M_2$ on the second airflow-blocking resin film layer 40b side are set within the range of 0.5 to 21; and furthermore, the values are made different from each other within this range. This configuration makes it possible to obtain the sound-absorbing material for a vehicle with excellent sound absorption performance having two peaks of sound absorption coefficient in a frequency band of 500 Hz to 8000 Hz, which causes annoying noise in a vehicle. In particular, setting the absolute value of the difference between the values of $E_1/M_1$ and $E_2/M_2$ to 0.8 or more enables widening the frequency band of absorbing sound.

Third Embodiment

Figure 7:
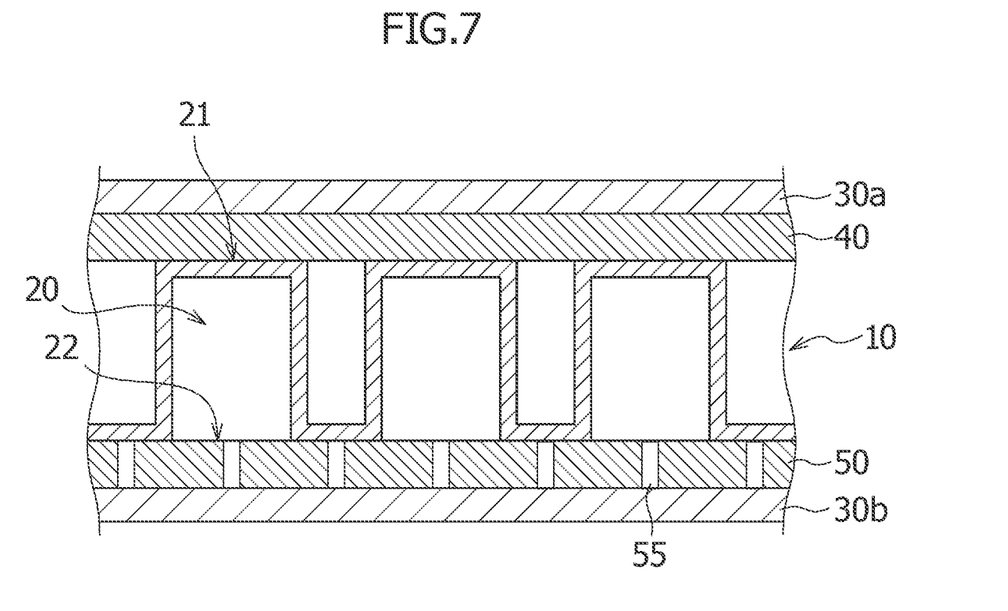
FIG. 7 is a schematic cross-sectional view showing another embodiment of a sound-absorbing material for a vehicle, according to the present invention.

As shown in FIG. 7, the sound-absorbing material for a vehicle of a third embodiment includes: the core layer 10 described above; an airflow-blocking resin film layer 40 provided on one surface thereof; a resin film layer 50 having a plurality of apertures on the surface of the core layer 10 opposite to the airflow-blocking resin film layer 40; and a first and a second nonwoven fabric layers 30a and 30b serving as an inner surface layer and an outer surface layer respectively and being provided on the respective airflow-blocking resin film layers. Note that the same configurations as those in the first and second embodiments are referred to by the same reference signs, and detailed descriptions thereof are omitted here.

The resin film layer 50 having a plurality of apertures (hereinafter referred to as the apertured film layer 50) has a plurality of holes 55 passing through the layer. The holes 55 are opened in advance before the adhesion to the core layer 10, for example, by a hot needle or punching (punching using a male die and a female die). In order to prevent the holes from being closed, it is preferable to have a hole shape in which burrs of the holes are minimized.

The holes 55 do not have any particular limitation on their aperture pattern, but they are preferably arranged in a staggered arrangement or a lattice arrangement. The aperture rate of the apertured film layer 50 is not particularly limited, but it is preferably in the range of 0.2% to 5%. The diameter of the holes 55 is preferably in the range of 0.25 mm to 2.5 mm, and more preferably in the range of 0.3 mm to 2.0 mm.

Note that the pitches of the holes 55 of the apertured film layer 50 do not necessarily have to be the same as the pitches Pcx and Pcy of the cells 20 of the core layer 10 shown in FIG. 2, and the holes 55 and the cells 20 do not necessarily have to be aligned when the apertured film layer 50 is adhered to the core layer 10. This is because the positions of the holes 55 of the apertured film layer 50 and the open ends 22 of the cells 20 of the core layer 10 randomly overlap with each other to enable appropriate communication between the inside and outside. It is preferable that the pitch of the holes 55 of the apertured film layer 50 be smaller than the pitch of the cells 20 of the core layer 10 at least in either an X direction or a Y direction.

According to the third embodiment, also with the apertured film layer 50 provided on the surface of the core layer 10 opposite to the airflow-blocking resin film layer 40, the same effect as in the first embodiment can be obtained. In addition, the aperture pattern preformed in the apertured film layer 50 can readily adjust and stably maintain the degree of blockage of the open ends 22 on at least one surface of the core layer 10. This enables controlling the peak of the sound absorption coefficient of the sound-absorbing material for a vehicle, and thus enables, together with the E/M value on the airflow-blocking resin film layer 40 side, more readily controlling the peak of the sound absorption coefficient of the sound-absorbing material for a vehicle in a desired frequency band.

EXAMPLES

Examples of the present invention are described below.

As Example 1, a sound-absorbing material for a vehicle, having a multilayer structure shown in FIGS. 4 and 5, was produced. A three-layered airflow-blocking resin film with a thickness of 50 μm (the material being polyethylene/polyamide/polyethylene, the Young's modulus of the film being 300 MPa) was adhered to one surface of the core layer having the structure of FIGS. 1 to 3. Furthermore, a spunbonded nonwoven fabric (the material being polyethylene terephthalate, the basis weight being 250 g/m$^2$) was adhered on the airflow-blocking resin film, as an inner surface layer. The total surface density of the airflow-blocking resin film and the nonwoven fabric was 180 g/m$^2$. Then, this multilayered structure was heated and pressed to obtain a sound-absorbing material for a vehicle in which the layers were adhered.

In order to evaluate the sound absorption performance of the sound-absorbing material for a vehicle of Example 1, a cylindrical sample having a diameter of about 29 mm was taken from the sound-absorbing material for a vehicle of Example 1 according to a method conforming to ISO10534-2 (JIS A 1405), and then the normal incident sound absorption coefficients at frequencies of 500 Hz to 6300 Hz of this sample were measured. As a result, the peak frequency of the sound absorption coefficient was 1000 Hz.

Figure 8:
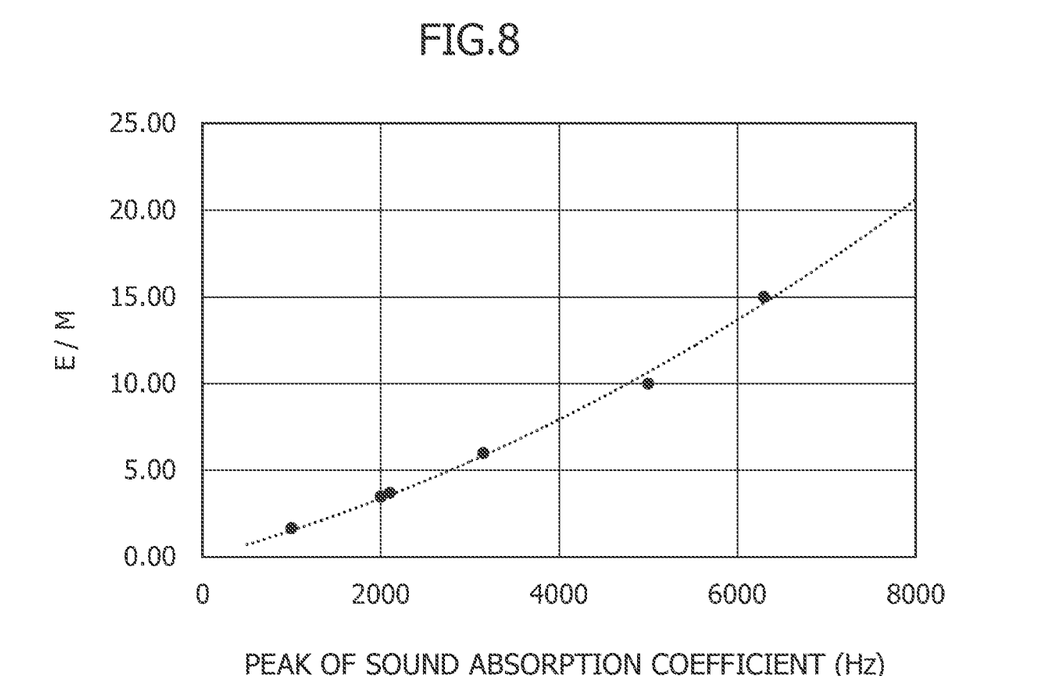
FIG. 8 is a graph showing a relationship between $E_1/M_1$ and sound absorption peak frequencies in examples of a sound-absorbing material for a vehicle, according to the present invention.

In the same manner as in Example 1, as shown in Table 1 below, sound-absorbing materials for a vehicle of Examples 2 to 6, which vary in the materials, the basis weights, the thicknesses, and the like of the nonwoven fabrics and the airflow-blocking resin films, were produced, and the sound absorption performances thereof were measured. Table 1 and FIG. 8 show the results including Example 1. Here, in any of the examples, the core layer used was made of a polypropylene resin and had a thickness of about 20 mm or less and a pitch Pcy between cells of about 10 mm or less.

TABLE 1

| Examples | Nonwoven fabric layer (Basis weight) | Airflow-blocking resin film layer (Thickness) | Young's modulus E | Surface density M | Peak of sound absorption coefficient [Hz] | E/M |
|---|---|---|---|---|---|---|
| 1 | Spunbonded (130 g/m$^2$) | 3-layer film (PE/PA/PE) 50 μm | 300 | 180 | 1000 | 1.67 |
| 2 | None | 3-layer film (PE/PA/PE) 50 μm | 300 | 50 | 3150 | 6.00 |
| 3 | Needle punched (230 g/m$^2$) | PP film 50 μm | 1000 | 270 | 2100 | 3.70 |
| 4 | Needle punched (225 g/m$^2$) | PP film 230 μm | 1500 | 430 | 2000 | 3.49 |
| 5 | Spunbonded (50 g/m$^2$) | PP film 100 μm | 1500 | 150 | 5000 | 10.00 |
| 6 | Spunbonded (30 g/m$^2$) | PP film 70 μm | 1500 | 100 | 6300 | 15.00 |

As shown in Table 1 and FIG. 8, the higher the value of E/M, which is the ratio of the Young's modulus E of the airflow-blocking resin film layer to the surface density M of the layer structure on the core layer, the higher the peak frequency of the sound absorption coefficient of the sound-absorbing material for a vehicle. Normally, it was generally thought that the airflow-blocking resin film layer does not contribute to sound absorption. It is however presumed that use of the airflow-blocking resin film layer having a Young's modulus E significantly smaller than that of general ones with respect to the surface density M contributes to sound absorption from the relationship with the predetermined structure of the core layer. In addition, as shown in FIG. 8, the results of Examples 1 to 6 indicate that, with E/M values being set to the range of 0.5 to 21, it is possible to produce sound-absorbing material for vehicles having desired sound absorption performance having a peak of sound absorption coefficient in the frequency band of 500 Hz to 8000 Hz, which causes annoying noise in vehicles.

INDUSTRIAL APPLICABILITY

According to the sound-absorbing material for a vehicle of the present invention, adhering an airflow-blocking resin film layer enables controlling the peak of the sound absorption coefficient into the frequency band of 500 Hz to 8000 Hz while maintaining a low weight and a high rigidity. More specifically, the sound-absorbing material for a vehicle of the present invention is useful for sound-absorbing cover components of noise generating sources such as floor carpets, floor spacers, trunk trims, trunk floors, dash insulators, and undercovers.

REFERENCE SYMBOL LIST

1 Core material
10 Core layer
11 Ridge portion
12 Valley portion
13 Side surface portion
14 Bottom surface portion
15 Ridge portion connecting surface
16 Valley portion connecting surface
17 Top surface
18 Back surface of core material
19 Through hole
20 Cell
21 Closed surface
22 Open end
30 Nonwoven fabric layer
40 Airflow-blocking resin film layer
50 Resin film layer having a plurality of apertures
55 Hole

The invention claimed is:

1. A sound-absorbing material for a vehicle, having a multilayer structure, the material comprising:
    a core layer having tubular cells, the tubular cells being arranged in a plurality of rows, wherein each of the cells in the core layer has a closed surface at one end and an open end at another end, and the open ends of the cells are arranged on both sides of the core layer such that rows of the open ends of the cells are in every other row; and
    a first airflow-blocking resin film layer adhered to one surface of the core layer,
    wherein the closed surfaces of the cells arranged in every other row serve as a surface for adhering the first airflow-blocking resin film layer and the core layer, and
    wherein a relationship between a Young's modulus $E_1$ (MPa) of the first airflow-blocking resin film layer and a surface density $M_1$ (g/m$^2$) of a layer structure on the first airflow-blocking resin film layer side with respect to the core layer is $0.5 < E_1/M_1 < 21$.

2. The sound-absorbing material for a vehicle, according to claim 1, wherein the first airflow-blocking resin film layer has a structure in which a plurality of materials having different Young's modulus are laminated.

3. The sound-absorbing material for a vehicle, according to claim 1, further comprising a second airflow-blocking resin film layer adhered to a surface of the core layer, the surface being opposite to the surface to which the first airflow-blocking resin film layer is adhered.

4. The sound-absorbing material for a vehicle, according to claim 3, wherein a relationship between a Young's modulus $E_2$ (MPa) of the second airflow-blocking resin film layer and a surface density $M_2$ (g/m$^2$) of a layer structure on the second airflow-blocking resin film layer side with respect to the core layer is $0.5 < E_2/M_2 < 21$, and
    the absolute value of the difference between $E_1/M_1$ and $E_2/M_2$ is 0.8 or more.

5. The sound-absorbing material for a vehicle, according to claim 1, further comprising a resin film layer having a plurality of apertures, the resin film layer being adhered to a surface of the core layer, the surface being opposite to the surface to which the first airflow-blocking resin film layer is adhered.

* * * * *